(12) United States Patent
Honthaas et al.

(10) Patent No.: US 9,766,070 B2
(45) Date of Patent: Sep. 19, 2017

(54) INTERFEROMETRIC MEASUREMENT DEVICE COMPRISING A FILTERING INTERFEROMETER

(71) Applicant: IXBLUE, Marly le Roi (FR)

(72) Inventors: Joachin Honthaas, Paris (FR); Herve Lefevre, Paris (FR); Eric Ducloux, Rueil Malmaison (FR); Jean-Jacques Bonnefois, Saint-Cloud (FR)

(73) Assignee: IXBLUE, Saint-Germain (FR)

( * ) Notice: Subject to any disclaimer, the term of this patent is extended or adjusted under 35 U.S.C. 154(b) by 0 days.

(21) Appl. No.: 14/653,330

(22) PCT Filed: Dec. 12, 2013

(86) PCT No.: PCT/FR2013/053059
§ 371 (c)(1),
(2) Date: Jun. 18, 2015

(87) PCT Pub. No.: WO2014/096636
PCT Pub. Date: Jun. 26, 2014

(65) Prior Publication Data
US 2015/0345949 A1    Dec. 3, 2015

(30) Foreign Application Priority Data
Dec. 19, 2012 (FR) ...................... 12 62363

(51) Int. Cl.
*G01C 19/72* (2006.01)
*G01C 19/64* (2006.01)

(52) U.S. Cl.
CPC .................... *G01C 19/64* (2013.01)

(58) Field of Classification Search
CPC ...... G01C 19/64; G01C 19/66; G01C 19/661; G01C 19/68; G01C 19/72; G01C 19/721;
(Continued)

(56) References Cited

U.S. PATENT DOCUMENTS 5,303,314 A * 4/1994 Duling, III ............. G02B 6/274
359/341.1
5,398,111 A * 3/1995 Cardarelli ............ G01C 19/727
356/461
(Continued)

FOREIGN PATENT DOCUMENTS

EP          0911930         4/1999

OTHER PUBLICATIONS

Optical Frequency Comb Generation using Asymmetrically Dual Driven Mach-Zehnder Modulator, Sakamoto et al, ECOC 2005, Proceedings—vol. 3, Paper We4.P.212.*
International Search Report, dated Apr. 7, 2014, from corresponding PCT application.
(Continued)

Primary Examiner — Tarifur Chowdhury
Assistant Examiner — Jonathon Cook
(74) Attorney, Agent, or Firm — Young & Thompson

(57) ABSTRACT

An interferometric measurement device includes a broad-spectrum spontaneous emission light source; a measurement interferometer, receiving a light signal with input light power and delivering a modulated light signal with output light power, the modulated light signal being modulated at a modulation frequency, depending on a physical parameter to be measured and being proportional to the input light power; an optical radiation detector, receiving the modulated light signal exiting from the measurement interferometer and delivering a modulated electrical signal representative of the output light power; a filtering interferometer, insensitive to the physical parameter to be measured, having a free spectral range ISL and a finesse F selected such that an interval of frequencies, centerd around an optimal frequency $f_{optim}$ equal to $(2k+1)ISL/2$, k being a natural number, and of width $\Delta f$ equal to $[0.9-(3/2F)]ISL$, includes the modulation frequency of the modulated light.

16 Claims, 4 Drawing Sheets

(58) Field of Classification Search
CPC .. G01C 19/727; G01B 9/02001; G01B 9/201;
G01B 9/02012; G01B 9/02055; G01B
9/02056; G01B 9/02065; G01B 2290/25
USPC .......................................................... 356/460
See application file for complete search history.

(56) References Cited

U.S. PATENT DOCUMENTS

| | | | | |
|---|---|---|---|---|
| 5,627,644 | A | * | 5/1997 | Sanders ............... G01C 19/721 356/464 |
| 5,850,286 | A | * | 12/1998 | Auerbach ............. G01C 19/72 356/460 |
| 6,490,045 | B1 | * | 12/2002 | Dakin ................ G01D 5/35322 250/227.19 |
| 2011/0141477 | A1 | * | 6/2011 | Sanders ............... G01C 19/727 356/461 |

OTHER PUBLICATIONS

Sunghwan Shin et al., "Characterization and Analysis of Relative Intensity Noise in Broadband Optical Sources for Optical Coherence Tomography", IEEE Photonics Technology Letters, vol. 22, No. 14 (Jul. 15, 2010).
Kevin Killian et al., "High-Performance Fiber Optic Gyroscope with Noise Reduction", Proceedings of SPIE, vol. 2292, pp. 225-263 (Nov. 1, 1994).
H.C. Lefevre, "Fundamentals of the Interferometric Fiber-Optic Gyroscope", Optical Review, vol. 4, No. 1A, pp. 20-27 (Jan. 1, 1997).

* cited by examiner

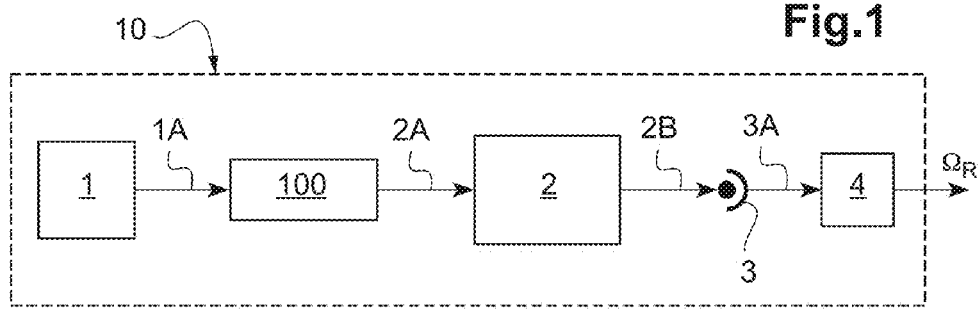
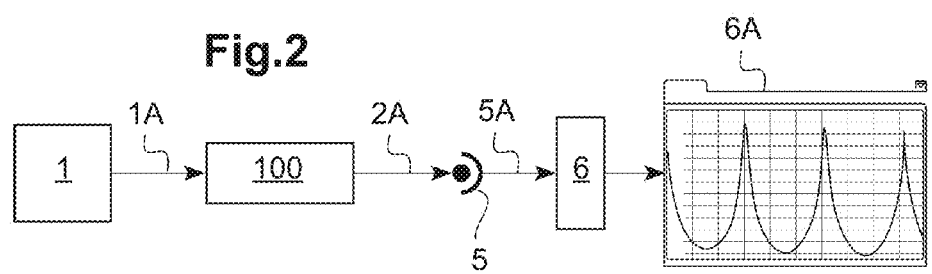
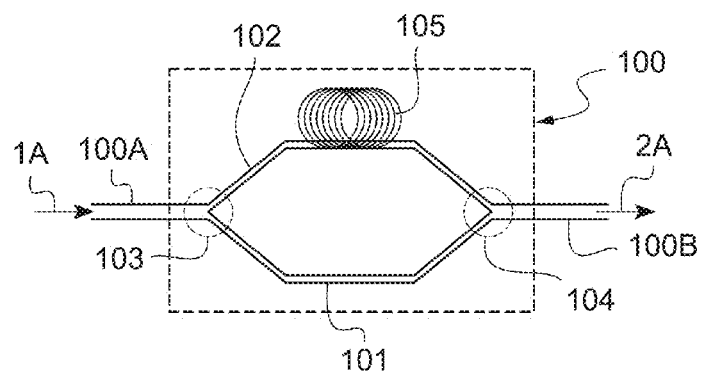
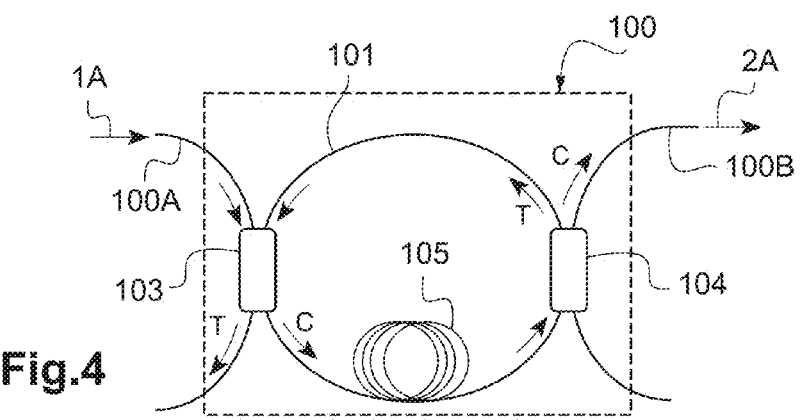

INTERFEROMETRIC MEASUREMENT DEVICE COMPRISING A FILTERING INTERFEROMETER

BACKGROUND OF THE INVENTION

The present invention generally relates to the field of optical metrology by interferometry.

It more particularly relates to an interferometric measurement device including a filtering interferometer allowing to reduce the excess intensity noise of the light source used in this interferometric measurement device.

The invention finds a particularly advantageous application in the making of a gyrometer comprising such an interferometric measurement device and in the making of an inertial attitude or navigation unit using such a gyrometer.

DESCRIPTION OF THE RELATED ART

Conventionally, an interferometric measurement device may comprise:
- a light source,
- a measurement interferometer receiving, as an input, a light signal of input light power $P_{in}$ and delivering, as an output, a modulated light signal of output light power $P_{out}$, said modulated light signal being modulated at a modulation frequency $f_m$, depending on a physical parameter to be measured and being proportional to the input light power $P_{in}$, and
- an optical radiation detector, receiving said modulated light signal exiting from said measurement interferometer and delivering a modulated electrical signal proportional to said output light power $P_{out}$.

It is then possible to deduce said physical parameter by a processing of the modulated electrical signal delivered by the optical radiation detector, in particular a demodulation at the modulation frequency $f_m$.

So as to free from the effects of temporal coherence of the source, it is known that the light source may be a broad-spectrum spontaneous emission light source.

It will be considered herein that a light source is of "spontaneous emission" type when the spectrum of this sources comprises a continuum of wavelengths.

As examples of such a source, it may be mentioned: sun, a radiant heat source, a semi-conductor super-luminescent diode, also referred to as super-radiant, or an amplifying fiber super-fluorescent source.

Such super-luminescent, super-radiant or super-fluorescent sources are in fact spontaneous emission sources whose spontaneous emission is amplified by a stimulated emission that keeps the spectral characteristics of the original spontaneous emission. The general term for this type of source is ASE source (for "Amplified by Spontaneous Emission").

Unlike an ASE source, a laser source is not a spontaneous emission light source.

It will also be considered that a light source has a broad spectrum when the ratio between the Full Width at Half Maximum or FWHM of its continuous spectrum and its average wavelength is higher than $10^{-7}$.

For example, an Erbium-doped (chemical symbol Er) fiber light source filtered by means of a Bragg filter has typically a pseudo-Gaussian spectrum centred about a wavelength of 1530 nm to 1560 nm and having a full width at half maximum (FWHM) of about 5 to 20 manometers (nm); this light source is hence a broad source, the ratio between its full width at half maximum and its average wavelength being equal to about 3 to $12 \times 10^{-3}$.

A broad-spectrum spontaneous emission light source emits a light source whose light power is subjected to different sources of noise.

Firstly, the photonic noise $B_{ph}$ or "shot noise" is known, which is the theoretical limit of any light source. The photonic noise is a white noise whose quantity is directly linked to the light power of the light source.

More precisely, the photonic noise varies, in absolute terms, as the square root of the light power and hence, in relative terms, as the inverse of the square root of the light power.

For example, a light signal at 1550 nm of 50 microwatt ($\mu$W) of power has a relative photonic noise $B_{ph}$ of $10^{-7}/\text{Hz}^{1/2}$ in standard deviation, i.e. of $10^{-14}/\text{Hz}$ in noise power, or also $-140$ decibels/Hz ($-140$ dB/Hz).

For a light signal of power 500 $\mu$W, hence ten times higher, the relative photonic noise $B_{ph}$ is of $-150$ dB/Hz, i.e. 10 dB/Hz lower in noise power, i.e. a factor 10 in noise power and a square root factor of 10 ($10^{1/2} \approx 3.16$) in standard deviation.

The "excess Relative Intensity Noise" or "excess RIN" is also known, which is also a white noise but for frequencies lower than the full width at half maximum of the spectrum in optical frequency, FWHM(f), i.e. 1 to 4 terahertz (THz) for a FWHM (in wavelength) of 5 to 20 nm about a wavelength of 1550 nm.

The excess relative intensity noise $B_{RIN}$ is, in noise power, approximately equal to the inverse of the full width at half maximum of the spectrum in optical frequency FWHM(f) of the broad-spectrum light signal, i.e. $B_{RIN} = 1/\text{FWHM}(f)$.

Indeed, it is known that the excess intensity noise comes from power beats between all the different frequency components of the continuous broad spectrum of the light signal that interfere between each other, these components having between each other different frequencies and a random phase.

The excess relative intensity noise spectrum is hence the result of an autocorrelation law: it begins at the zero frequency and has a width that is substantially equal to the width of the light source optical spectrum, the latter being on the other hand centred about a very high frequency, about 200 THz for a wavelength of 1550 nm.

Hence, the same light signal of 50 $\mu$W of power that would have a full width at half maximum in optical frequency FWHM(f) of 1 THz would have, in low frequency, an excess relative intensity noise $B_{RIN}$ of $-120$ dB/Hz in noise power, i.e. 20 dB/Hz above the relative photonic noise power $B_{ph}$ of $-140$ dB/Hz.

Such a broad-spectrum spontaneous emission signal has an excess relative intensity noise that is the dominant source of noise.

An interferometric measurement device that would use such a light signal without particular precaution has hence poor performances, hence limiting the accuracy of the measurement of the physical parameter to be measured.

SUMMARY OF THE INVENTION

In order to remedy the above-mentioned drawback of the state of the art, the present invention proposes an interferometric measurement device in which the modulated light signal carrying the information about the parameter to be measured has a reduced excess relative intensity noise.

For that purpose, the invention relates to a interferometric measurement device including:

a broad-spectrum spontaneous emission light source, a measurement interferometer including a modulator, and receiving, as an input, a light signal of input light power $P_{in}$ and delivering, as an output, a modulated light signal of output light power $P_{out}$, said modulated signal being modulated at a modulation frequency $f_m$, depending on a physical parameter to be measured and being proportional to said input light power $P_{in}$, and an optical radiation detector, receiving said modulated light signal exiting from said measurement interferometer and delivering a modulated electrical signal proportional to said output light power $P_{out}$, said interferometric measurement device being characterized in that it includes a filtering interferometer insensitive to said physical parameter to be measured placed between said light source and said measurement interferometer or between said measurement interferometer and said optical radiation detector, said filtering interferometer having a free spectral range ISL, expressed in frequency, and a finesse F selected so that a frequency interval, centred about an optimum frequency $f_{optim}$ equal to (2k+1) ISL/2, k being a natural number, and of width $\Delta f$ equal to [0.9–(3/2F)] ISL, comprises the modulation frequency $f_m$ of the modulated light signal at the output of the measurement interferometer.

Hence, thanks to the use of a filtering interferometer according to the invention, the optical spectrum of the spontaneous emission light source, which is hence broad, will undergo a transformation during its transmission by the filtering interferometer. The light power at the output of the filtering interferometer has a periodic modulation as a function of the frequency, so that the transmitted spectrum is a fluted spectrum with peaks and troughs, corresponding to maxima and minima, respectively, for the light transmission of the filtering interferometer.

This phenomenon is conventionally referred to as "white light interferometry".

In the following of the description, we will call "flutes" the peaks of the fluted spectrum transmitted by the filtering interferometer and corresponding to maxima of light transmission by the filtering interferometer.

As known, the filtering interferometer has a free spectral range ISL, expressed in frequency (unit: hertz), which is function of the optical and physical characteristics thereof.

This free spectral range ISL, expressed in frequency, is:

the inverse of the propagation time difference between the two arms in the case of a two-waves, unbalanced filtering interferometer, for example a Mach-Zehnder or Michelson interferometer, and the inverse of the propagation time over a passage in the resonator in the case of a multiple-wave resonant interferometer, for example a Fabry-Perot interferometer or a ring resonator.

In the case of a silica fiber-optic filtering interferometer, this free spectral range ISL is approximately equal to 200 kHz for an unbalance length L between the arms of 1 kilometer, with a multiplicative law of the type: ISL×L=200 kHz·km.

Frequently, the flutes of the optical spectrum of the filtered light signal exiting from the filtering interferometer are centred about frequencies equal to an integer multiple of the free spectral range ISL, i.e. k·ISL, k being a natural number, zero or not ((k=0, 1, 2, . . . , etc).

Two successive flutes, of frequencies $f_1$=k·ISL and $f_2$=(k+1)·ISL are separated in frequency by a distance of $\delta f=|f_2-f_1|$ equal to the free spectral range ISL, because $\delta f=|f_2-f_1|=(k+1)\cdot ISL-k\cdot ISL=ISL$.

Between these two flutes is a transmission trough that is at equal distance from the two flutes and that is centred on a median optical frequency equal to $(f_1+f_2)/2=[k\cdot ISL+(k+1)\cdot ISL]/2=(2k+1)$ ISL/2.

The width of each flute is all the more low (i.e. the flutes are all the more thin) that the finesse F of the filtering interferometer is great. Conversely, the interval over which extends the transmission trough is all the more broad that the finesse F of the filtering interferometer is great.

Now, the same autocorrelation law applies to determine the excess relative intensity noise $B_{RIN}$, and the frequency distribution of the latter reproduces from the zero frequency the flutes and the finesse of the very high frequency optical spectrum.

The excess relative intensity noise $B_{RIN}$ is hence increased at the frequencies equal to 2k·ISL (and at the zero frequency in particular) with respect to the original excess relative intensity noise, before the filtering interferometer.

The excess relative intensity noise is hence no longer a white noise but has a comb of periodic flutes similar to that of the optical spectrum of the filtered light signal, this comb nevertheless starting, as already seen above, from the zero frequency, and that up to the maximum frequency of the intensity noise of the light signal emitted by the original light source, i.e. up to the full width at half maximum in optical frequency FWHM(f) of the optical spectrum of the light signal of the light source.

It has been analysed within the framework of this invention that, on the other hand, the excess relative intensity noise $B_{RIN}$ is reduced, thanks to the use of the filtering interferometer, in the troughs between the flutes of the noise, i.e. about the optimum frequencies $f_{optim}$ equal to (2k+1)·ISL/2.

By adjusting the period of the flutes, hence the free spectral range ISL, thanks to the temporal unbalance of the filtering interferometer, it is hence possible to match a zone of reduction of the original excess intensity noise about the optimum frequencies $f_{optim}=(2k+1)\cdot ISL/2$ with the modulation frequency $f_m$ of the measurement interferometer.

It will be considered herein that the reduction zones extend over a frequency interval of width $\Delta f$ that is equal to [0.9–(3/2F)] ISL, and that about the optimum frequencies $f_{optim}$ that are equal to (2k+1)·ISL/2.

The frequency distribution of the excess relative intensity noise $B_{RIN}$ of the light signal is then modified, or "sculpted", by the filtering interferometer. The excess relative intensity noise is concentrated on the comb of periodic flutes and reduced in the troughs of this comb.

By adjusting the free spectral range ISL of the filtering interferometer, the noise comb may be made not-cumbersome for the measurement of the physical parameter to be measured at the modulation frequency $f_m$ of the modulated light signal that exits from the measurement interferometer and that carries the information about the measurement of this physical parameter.

Advantageously, by selecting the free spectral range ISL and the finesse F of the filtering interferometer so that the noise reduction zone, centred about the optimum frequency $f_{optim}=(2k+1)$ ISL/2 and having a width $\Delta f$ equal to [0.9–(3/2F)] ISL, comprises the modulation frequency $f_m$ of the measurement interferometer, the excess relative intensity noise of the modulated light signal at the frequency $f_m$ is then reduced and the accuracy of measurement of the physical parameter to be measured by means of the measurement interferometer is thus improved.

Moreover, other advantageous and non-limitative characteristics of the device according to the invention are the following:

said filtering interferometer is a two-waves interferometer, for example a Mach-Zehnder or Michelson interferometer;

said filtering interferometer is a multiple-wave resonant interferometer, for example a Fabry-Perot interferometer or a ring resonator.

said filtering interferometer is configured in a dual-passage mode, i.e. a round trip;

said filtering interferometer comprises a fiber-optic interferometer, that preferably comprises a polarization-maintaining optical fiber;

said filtering interferometer comprises a ring resonator and two optical couplers, whose ratios T/C of transmission coefficient T to coupling coefficient C are comprised between 70/30 and 95/5;

said ring resonator has a null surface;

said filtering interferometer is placed between said light source and said measurement interferometer, said interferometric measurement device including a doped-fiber optical amplifier, for example doped with a rare earth, which is placed between said filtering interferometer and said measurement interferometer;

said measurement interferometer comprises a fiber-optic SAGNAC ring interferometer;

the length of said optical fiber of the filtering interferometer is slightly higher, preferably between 2% and 5% longer, than the length of said optical fiber of the SAGNAC ring interferometer.

The present invention finds a particularly advantageous application in the realization of a fiber-optic gyrometer including an interferometric measurement device, the measurement interferometer of which is a fiber-optic SAGNAC ring interferometer adapted to measure the rotational speed about an axis of rotation perpendicular to the plane of the SAGNAC ring.

Hence, the present invention also relates to such a fiber-optic gyrometer and an inertial attitude and navigation unit comprising such a gyrometer.

The following description, in relation with the appended drawings given by way of non-limitative examples, will allow to understand in what consists the invention and how it may be made.

BRIEF DESCRIPTION OF THE DRAWING FIGURES

In the appended drawings:

FIG. 1 is a schematic view of an interferometric measurement device according to a first embodiment;

FIG. 2 is a schematic view of an optical mounting allowing to measure the performances of a filtering interferometer entering into the construction of the interferometric measurement device of FIG. 1;

FIG. 3 is a schematic view of a two-wave filtering interferometer of the Mach-Zehnder type entering into the construction of the interferometric measurement device according to the first embodiment;

FIG. 4 is a schematic view of a multiple-wave filtering interferometer of the ring resonator type entering into the construction of the interferometric measurement device according to the first embodiment;

DETAILED DESCRIPTION OF THE INVENTION

Figure 7:
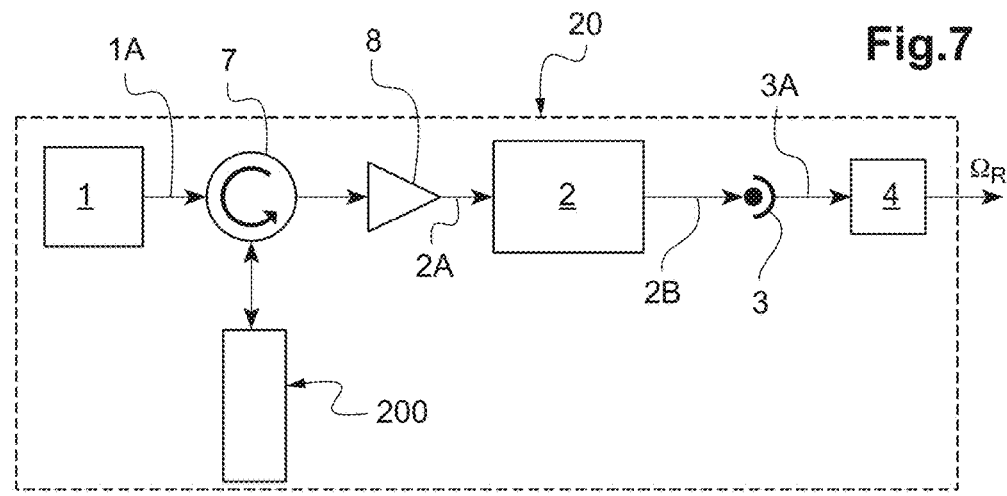
FIG. 7 is a schematic view of an interferometric measurement device according to a second embodiment.

In FIGS. 1 and 7 are shown two schematic views showing an interferometric measurement device according to two embodiments of the invention.

It these two embodiments, the interferometric measurement device 10; 20 includes a light source 1, a measurement interferometer 2 and an optical radiation detector 3.

The light source 1 is herein a broad-spectrum spontaneous emission light source. It is for example an ASE light source based on an optical fiber doped with a rare earth that is erbium (chemical symbol: Er), as those used in the optical telecommunication field.

This light source 1 may be filtered by means of a Bragg filter (not shown), so that it has an optical spectrum of substantially Gaussian shape, which is centred about an average wavelength $\lambda_0$ of 1530 nm, i.e. 196 THz in frequency, and which has a full width at half maximum FWHM of 6.5 nm, i.e. 833 GHz, expressed in frequency.

This light source 1 is hence a broad-spectrum light source because the ratio between its full width at half maximum FWHM and its average wavelength $\lambda_0$ is equal to $4.2 \times 10^{-3}$, higher than $10^{-7}$.

This light source 1 emits a source light signal 1A marred by an excess relative intensity noise $B_{RIN}$ whose noise power spectral density is equal to 1/FWHM i.e. $1.2 \times 10^{-12}$/Hz, i.e. −119 dB/Hz.

The photonic noise power spectral density is constant and independent of the frequency, the photonic noise being known to be a white noise.

As mentioned hereinabove, it is known that the excess intensity noise is not strictly a white noise. Nevertheless, for the light source 1 that has a Gaussian optical spectrum of full width at half maximum FWHM=6.5 nm about the average wavelength $\lambda_0$=1530 nm, the power spectral density of the excess relative intensity noise may be considered as being constant below a frequency equal to the full width at half maximum in optical frequency FWHM(f), i.e. 833 GHz.

At the output of the measurement interferometer 2, the modulated light signal 2B is attenuated but, with no filtering interferometer 100; 200, would remain marred by the same excess relative intensity noise of −119 dB/Hz as that of the light source 1. With an output power of 50 µW, the relative photonic noise $B_{ph}$ would be equal to $10^{-7}/Hz^{1/2}$, i.e. −140 dB/Hz for the relative photonic noise power spectral density.

Hence, for a frequency band comprised between 0 and 100 MHz, for example, the power density of the excess relative intensity noise $B_{RIN}$ is very higher than the power density of the relative photonic noise, the difference being as high as 21 dB/Hz.

The measurement interferometer 2 of the interferometric measurement device 10; 20 in the two embodiments of the invention herein comprises a fiber-optic SAGNAC ring interferometer.

The measurement interferometer 2 is intended to measure a physical parameter to be measured.

Herein, this physical parameter to be measured is the component $\Omega_R$ of the rotational speed of the measurement interferometer 2, according to an axis of rotation perpendicular to the plane or the ring of the SAGNAC interferometer.

As known (see in particular H. Lefèvre, "*The Fiber-Optic Gyroscope*", Artech House, 1993), this SAGNAC ring interferometer includes a coil of a preferably single-mode and polarization-maintaining optical fiber, an optical coupler and an Y coupler combined to a pair of phase modulators (not shown elements).

The fiber-optic coil is herein a coil of single-mode fiber of 1 kilometer long, so that the SAGNAC ring interferometer has a proper frequency $f_p$=103.45 kHz.

The measurement interferometer 2 receives, as an input, a filtered light signal 2A of input light power $P_{in}$ and delivers, as an output, a modulated light signal 2B of output light power $P_{out}$, which is proportional to the input power $P_{in}$ and depends on the parameter to be measured $\Omega_R$.

The modulation of the modulated light signal 2B is made thanks to the pair of phase modulators of the measurement interferometer 2. The modulation is made desirable so as to improve the signal to noise ratio of the measurement performed by the measurement interferometer 2.

The modulated light signal 2B is hence modulated at a modulation frequency $f_m$.

Advantageously, it is known that this modulation frequency $f_m$ can be an odd multiple of the proper frequency $f_p$ of the SAGNAC ring interferometer.

In the following, it will be considered that the modulation frequency $f_m$ of the modulated light signal 2B is equal to the proper frequency $f_p$ of the interferometer, i.e. $f_m=f_p$=103.45 kHz for a fiber-optic coil of 1 km long.

The interferometric measurement device 10; 20 hence also includes an optical radiation detector 3 that is sensitive to and receives the modulated light signal 2B exiting from the measurement interferometer 2.

The optical radiation detector 3 herein comprises a semiconductor PIN photodiode.

The optical radiation detector 3 delivers a modulated electric signal 3A that is a signal representative of the output light power $P_{out}$.

The modulated light signal 2B being a modulated signal, the modulated electric signal 3A is also modulated, at the same modulation frequency $f_m=f_p$=103.45 kHz.

It will be noted that such a modulation frequency $f_m$ is a relatively low frequency from an electronic point of view, so that the photodiode 3 follows with no difficulty the modulated light signal 2B.

In the two embodiments of the invention, shown in FIGS. 1 and 7, the interferometric measurement device 10; 20 also includes signal processing means 4 that exploit, by demodulation, the modulated electric signal 3A delivered by the optical radiation detector 3 so as to determine the component $\Omega_R$ of the rotational speed of the measurement interferometer 2.

In order to reduce the excess intensity noise of the light source 1 of the interferometric measurement device 10; 20, a filtering interferometer 100, 200 is also provided, which is intended to flute the optical spectrum of the source light signal 1A.

This filtering interferometer 100, 200 may indifferently be placed either between the light source 1 and the measurement interferometer 2, or between the measurement interferometer 2 and the optical radiation detector 3.

For the sake of clarity, the description developed hereinafter only refers to the first alternative.

Hence, in the two embodiments of the invention, shown in FIGS. 1 and 7, the filtering interferometer 100; 200 is herein placed between the light source 1 and the measurement interferometer 2, so that the filtering interferometer 100; 200 receives, as an input, the source light signal 1A and delivers, as an output, the filtered light signal 2A.

In the two embodiments of the interferometric measurement device 10; 20 shown in FIGS. 1 and 7, the filtering interferometer 100; 200 comprises a fiber-optic interferometer (see FIGS. 3, 4, 9, and 10).

In this configuration, it is advantageously provided that the length of the optical fiber of the filtering interferometer 100, 200 is slightly higher, preferably between 2% and 5% longer, than the length of the optical fiber of the measurement interferometer 2, when the latter comprises a SAGNAC ring interferometer.

Using a longer optical fiber for the filtering interferometer 100; 200 allows to then free from spurious signals on the filtered light signal 2A coming from the back scattering in the optical fiber of the measurement interferometer 2.

Indeed, from the coherence point of view, the light source 1 emits a wave train of coherence time $\tau_c$ equal to the inverse of the full width at half maximum FWHM of the spectrum in optical frequency ($\tau_c$=1/FWHM), i.e. the coherence time $\tau_c$ is of the order of one picosecond (1 ps) for a full width at half maximum FWHM of 1 THz. After the filtering interferometer 100; 200, this wave train goes out into a series of coherent wave trains spaced from each other by the time of propagation in the filtering interferometer 100; 200. If this time of propagation is higher than the time of propagation in the measurement interferometer 2, a wave train of the series will enter after any back scattering of the previous wave train, hence avoiding problems of coherence noise.

In order to evaluate the performances of the filtering interferometer 100; 200, analysis means are used, which comprise, on the one hand, a photo-detector 5 and, on the other hand, an electric spectrum analyzer 6.

The photo-detector 5 delivers an electric signal 5A to the electric spectrum analyzer 6, this electric signal 5A exhibiting an electric noise, whose spectral power distribution is directly linked (linearly in the case of a photo-detector 5 used in its zone of linearity) to the noise power spectral density of the filtered light signal 2A.

The electric spectrum analyzer 6 then delivers a curve 6A representative of the value of the excess intensity noise power density as a function of the frequency. This result is expressed in dB·Volt (symbol: dB·V).

In other words, the electric noise power density measured by the spectrum analyzer 6 at an electric frequency $f_{elec}$ (order of magnitude of $f_{elec}$: between 0 and 10 MHz) is the quadratic mean of the beats between all the components of the filtered light signal 2A, at the optical frequencies $f_{opt}$ (order of magnitude of $f_{opt}$: about 200 THz) and $f_{opt}+f_{elec}$ of the optical spectrum of the filtered light signal 2A, respectively.

First Embodiment

In a first embodiment of the invention, shown in FIG. 1, the filtering interferometer 100 is configured as a single-passage type interferometer.

In a first variant, shown in FIG. 3, the filtering interferometer 100 is a two-wave interferometer.

More precisely, according to this first variant of the first embodiment, the filtering interferometer 100 is an interferometer of the Mach-Zehnder type.

The source light signal 1A is injected into the filtering interferometer 100 by means of an optical fiber coupled to the input arm 100A of the Mach-Zehnder interferometer.

The source light signal 1A, of power $P_0$, is then split into two light signals by means of an input Y coupler 103, which is herein designed so that the two corresponding split light signals are of equal power $P_0/2$.

The two split light signals then propagate in the two optical waveguides 101, 102, to then recombine together at an output Y coupler 104, the two split light signals being superimposed and interfering with each other to form the filtered light signal 2A transmitted on the output arm 100B, then coupled in an optical fiber to be driven to the fibered photo-detector 5 so as to measure the light power of the filtered light signal 2A.

The filtering interferometer 100 is unbalanced, i.e. at the output of the filtering interferometer 100, the light signal that has passed in the first optical waveguide 101 and the light signal that has passed in the second optical waveguide 102 are phase-shifted relative to each other by a phase shift $\Delta\phi$ that is non zero.

For that purpose, the filtering interferometer 100 includes, on the path of the second light signal, a fiber-optic coil 105 of optical length $\Delta L_{opt}$. By definition, the optical length $\Delta L_{opt}$ is the product of the geometric length (in meters) of the fiber-optic coil 105 by the optical index of the latter, which is, for the wavelength domain of the light source 1, in the case of a silica optical fiber, equal to about 1.45. Hence, the optical length $\Delta L_{opt}$ is herein equal to $1.45 \cdot 10^3$ m, allowing to introduce a phase difference $\Delta\phi = (2\pi/c) \cdot f_{opt} \times \Delta L_{opt}$ ($c \approx 3 \times 10^8$ m·s$^{-1}$ being the speed of light) between the two arms of the Mach-Zehnder interferometer.

The filtered light signal 2A at the output of the filtering interferometer 100 has then an input light power $P_{in} = P_0 \cos^2(\Delta\phi/2) = P_0 \cos^2(\pi \cdot f_{opt} \cdot \Delta f_{opt}/c)$.

The filtering interferometer 100 has thus a response, equal to the ratio $P_{in}/P_0$ between the input light power $P_{in}$ and the source light power $P_0$, which is periodic as a function of the optical frequency $f_{opt}$ of the input light signal 1A.

Figure 5:
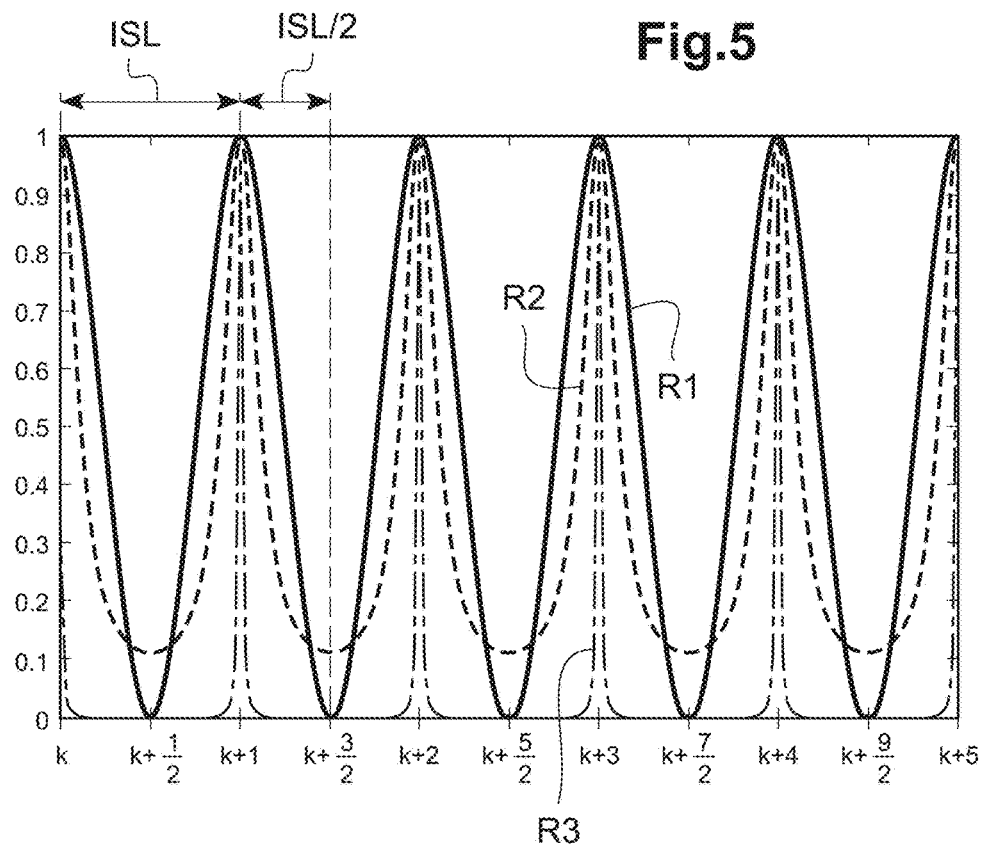
FIG. 5 shows, in linear ordinate, the transmission curves normalised in frequency of the filtering interferometer according to the two variants of FIGS. 3 and 4.

In FIG. 5 are shown the response functions of the filtering interferometer 100 in the first embodiment, where the filtering interferometer 100 is an interferometer configured in single-passage mode.

The curve R1 of FIG. 5 corresponds to the response function of the filtering interferometer 100 according to the first variant where filtering interferometer 100 is a Mach-Zehnder interferometer, hence a two-waves interferometer.

In FIG. 5, it can be seen, as known, that the response function of an unbalanced Mach-Zehnder interferometer is in square cosine and thus periodic, the period being called the free spectral range ISL.

Moreover, the reduced optical frequency $f_{opt}/ISL$ has been reported, on the abscissa axis of FIG. 5, from value k to value k+5. This representation will allow to compare the different response curves R1, R2, R3 of FIG. 5.

The free spectral range ISL of the filtering interferometer 100 in this first variant of the first embodiment of the interferometric measurement device 10 is herein equal to $c/\Delta L_{opt} = 206.9$ kHz.

As the average optical frequency $f_0$ of the light source 1 is far higher than the free spectral range ISL, because it is equal to $f_0 = c/\lambda_0 = 196$ THz, the value k is herein of the order of $10^9$.

The light transmission, and hence the response, is maximum and equal to 1 when the phase difference $\Delta\phi$ is equal to $2 k \cdot \pi$, k being a natural number, and the light transmission, and also the response, is minimum when the phase difference $\Delta\phi$ is equal to $(2k'+1) \cdot \pi$, k' being also a natural number.

The flutes introduced in the spectrum of the filtered light signal 2A are perfectly contrasted, i.e. the minima of the light transmission are null, when the input coupler 103 and the output coupler 104 are 50/50 couplers, splitting equally the source light signal 1A in the two arms 101, 102 of the filtering interferometer 100 (see FIG. 3).

The contrast of the flutes is defined as being the ratio between the difference and the sum of the maximum value of the light transmission (respectively of the response) and of the minimum value of the light transmission (respectively of the response).

Two successive transmission maxima are distant, in frequency, by the free spectral range ISL. Likewise, two successive transmission minima are distant, in frequency, by the free spectral range ISL equal to $c/\Delta L_{opt}$.

Moreover, the distance, expressed in frequency, between a transmission maximum and an adjacent transmission minimum is equal to half the free spectral range ISL (also expressed in frequency), i.e. ISL/2.

Another important parameter of the response of the filtering interferometer 100 is its finesse F. The latter is defined as being the ratio between the free spectral range ISL, expressed in frequency, and the full width at half maximum FWHM(f) of the flutes.

Hence, in this first variant of the first embodiment, the finesse F of the two-waves filtering interferometer 100 is herein equal to 2, the width of the flutes of the response function R1 (see FIG. 5) being equal to half the period of these same flutes.

In a second variant, shown in FIG. 4, the filtering interferometer 100 is a multiple-wave resonant interferometer.

More precisely, according to this second variant of the first embodiment, the filtering interferometer 100 comprises a ring resonator 101.

It is known that, from the point of view of its light transmission or its response, such a filtering interferometer 100 is equivalent to a Fabry-Perot interferometer.

The source light signal 1A is injected in the filtering interferometer 100 by mean of an optical fiber coupled to the input port 100A of the filtering interferometer 100.

The source light signal 1A, of power $P_0$, is then coupled to a fiber-optic ring 101 by means of an input fiber-optic coupler 103.

Generally, a fiber-optic coupler has a coupling coefficient C that corresponds to the ratio between the light power coupled in the fiber-optic ring 101 and the power of the source light power 1A injected in the input port 100A.

After coupling, the light signal circulates in the fiber-optic ring 101 and at each turn in this fiber-optic ring 101, a portion of the light signal is taken and coupled towards an output port 100B of the filtering interferometer 100 by mean of an output fiber-optic coupler 104, which is herein identical to the input fiber-optic coupler 103, and has hence the same coupling coefficient C as the input fiber-optic coupler 103.

Complementary, the portion of the light signal incident on the output fiber-optic coupler 104 that is not coupled towards the output port 100B is transmitted in the fiber-optic ring 101 of the filtering interferometer 100 with a transmission coefficient T.

Likewise, this transmission coefficient T is defined as being the ratio between the light power transmitted by one of the fiber-optic couplers in the fiber-optic ring 101 and the light power incident on this coupler inside the fiber-optic ring 101.

The coupling coefficient C and the transmission coefficient T are linked by the following relation: $1-(C+T)=A$, where the term A corresponds to the intrinsic losses of the fiber-optic ring 101 corresponding essentially to the losses by absorption or by scattering in the ring 101.

It will be considered, in the following, that the losses in the ring 101 are very low, typically of the order of a few percent, so that they can be neglected in the remaining of the description. Hence, the following relation is verified: $C+T=1$.

It will be understood in the light of the description of FIG. 4, that the filtering interferometer 100 herein operates like an optical resonator, a plurality of waves circulating in the ring 101 of the filtering interferometer 100, so that the different light signals coupled towards the output port 100B by the output coupler 104 are superimposed and interfere with each other to form the filtered light signal 2A transmitted on the output port 100B, then coupled in an optical fiber to be driven towards the fibered photo-detector 5 so as to measure the light power of the filtered light signal 2A.

As shown in FIG. 4, the filtering interferometer 100 herein includes a fiber-optic coil 105, of optical length $\Delta L_{opt}$ herein also equal to $1.45 \cdot 10^3$ m, arranged in the ring 101 of the filtering interferometer 100.

So configured in this second variant, the filtering interferometer 100 filters the source light signal 1A and delivers the filtered light signal 2A.

In FIG. 5 are shown response curves $P_{in}/P_0$ of such a filtering interferometer 100 as a function of different values of the coupling coefficient C and transmission coefficient T.

As known, these response curves $P_{in}/P_0$ follow a law of the type: $P_{in}/P_0 = 1/[1+m \sin^2(\Delta\phi/2)]$, where $\Delta\phi$ is the phase difference introduced by the filtering interferometer 100 during the propagation over one turn of the fiber-optic ring 101, and m represents, as in a Fabry-Perot interferometer, the "Airy factor" of the filtering interferometer 100 in a ring resonator configuration (see FIG. 4).

This Airy factor is linked to the transmission coefficient T of the two fiber-optic couplers 103, 104 by the relation: $m=4 \cdot T/(1-T)^2=4 \cdot T/C^2$ (because $C+T=1$, see supra).

The curve R2 corresponds to a filtering interferometer 100 in the second variant of the first embodiment, where the couplers 103, 104 of the filtering interferometer 100 have a coupling coefficient C equal to 50% and a transmission coefficient T equal to 50%.

The curve R3 corresponds to a filtering interferometer 100 in the second variant of the first embodiment, where the couplers 103, 104 of the filtering interferometer 100 have a coupling coefficient C equal to 5% and a transmission coefficient T equal to 95%.

Let's remind here that, the reduced optical frequency $f_{opt}/ISL$ is reported on the abscissa axis, ISL being the free spectral range of the filtering interferometer 100.

Conventionally, it is found that the response curves of a ring resonator are periodic, the flutes being also separated by the free spectral range ISL.

As known, the free spectral range ISL of the filtering interferometer 100 has a free spectral range ISL equal to $c/L_{ann}$ where $L_{ann}$ is the optical length of the resonant ring of the filtering interferometer 100, comprising the fiber-optic ring 101 and the fiber-optic coil 105.

It will be considered herein that, in the case of a filtering interferometer 100 shown in FIG. 4, the flutes obtained are not perfectly contrasted.

Indeed, the response curves R2, R3 have minimum values of transmission that are not null but equal to $1/(1+m)$, the contrast of the flutes being hence equal to $m/(m+2)$.

Moreover, as known, the finesse F of a ring resonator, similar to a Fabry-Perot interferometer is such that $F=\pi m^{1/2}/2$.

It is hence recognised in FIG. 5 that, for the filtering interferometer 100 of FIG. 4:

the contrast of the flutes increases if the transmission coefficient T of the couplers 103, 104 of the filtering interferometer 100 increases, and the finesse F also increases with this transmission coefficient T.

The response curve R3 of FIG. 5 being obtained for a transmission coefficient T equal to 95%, this response curve R3 has thinner and more contrasted flutes than the response curve R2 of FIG. 5 that has been obtained for a transmission coefficient T equal to 50%.

The different parameters of the multiple-wave filtering interferometer 100 in this second variant of the first embodiment have been reported in Table 1 hereinafter.

TABLE 1

| | Response curve R2 | Response curve R3 |
|---|---|---|
| (single passage) | | |
| Coupling coefficient C | 50% | 5% |
| Transmission coefficient T | 50% | 95% |
| Optical length of the ring $L_{ann}$ (m) | 1450 | 1450 |
| Airy factor m | 8 | 1520 |
| Contrast | 0.8 | 0.999 |
| Finesse F | 4.4 | 61.2 |
| Free spectral range ISL (kHz) | 206.9 | 206.9 |
| Ratio $f_m/ISL$ ($f_m$ = 103.45 kHz) | 0.5 | 0.5 |

Figure 6:
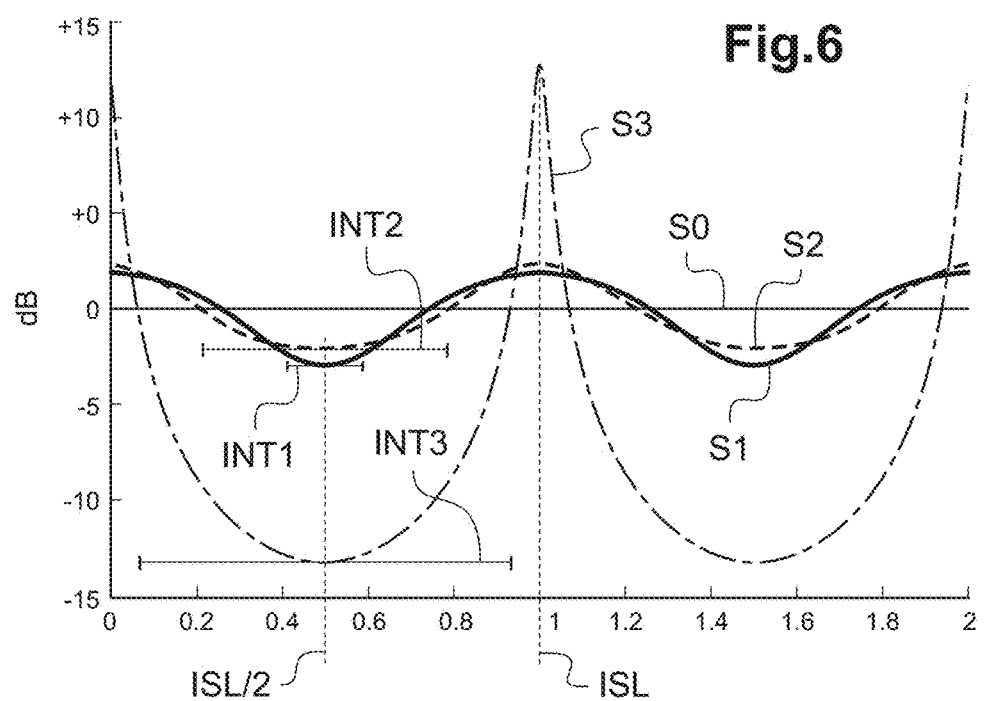
FIG. 6 shows, in logarithmic ordinate, the curves of frequency variations of the excess relative intensity noise power density obtained for the filtering interferometer according to the variants of FIGS. 3 and 4.

In FIG. 6 are shown, in logarithmic ordinate, curves S0, S1, S2, S3 of noise power density obtained by the spectrum analyzer 6 of FIG. 2.

These curves S0, S1, S2, S3 show the variations (reduction or increase) of the power spectral density, expressed in decibels, of the excess relative intensity noise $B_{RIN}$ as a function of the reduced electric frequency $f_{elec}/ISL$ before and after filtering by the filtering interferometer 100.

Hence, the curve S0 of FIG. 6, which corresponds to the excess relative intensity noise power spectral density of the source light signal 1A having not been filtered by the filtering interferometer 100, has a constant value equal to 0 dB.

The curves S1, S2, S3 themselves correspond to the response curves R1, R2, R3 of FIG. 5.

In FIG. 6 are shown, for each curve S1, S2, S3, a frequency interval INT1, INT2, INT3, that is centred about an optimum frequency $f_{optim}$ equal to ISL/2 and of width $\Delta f$ equal to $[0.9-(3/2F)]$ ISL.

It is observed that, for each curve S1, S2, S3, the frequency interval INT1, INT2, INT3 comprises the modulation frequency $f_m$ of the measurement interferometer 2.

Moreover, for this frequency interval INT1, INT2, INT3, and in particular for the modulation frequency $f_m$, it is observed that the excess relative intensity noise power density of the curves S1, S2, S3 has been reduced with respect to the curve S0 corresponding to the non-filtered source light signal 1A.

More precisely, for the two-wave filtering interferometer 100 of FIG. 3, the value of the excess intensity noise power density on the filtered light signal 2A has been reduced by 3 dB (curve S1) with respect to the non-filtered light signal (curve S0).

Likewise, for multiple-wave the filtering interferometer 100 of FIG. 4, in the case of a coupling coefficient C equal to 50% (curve S2), the value of the excess intensity noise power density on the filtered light signal 2A has been reduced by 2 dB with respect to the non-filtered light signal (curve S0).

For the ring-resonator filtering interferometer 100 of FIG. 4, in the case of a coupling coefficient C equal to 5% (curve S3), the value of the excess intensity noise power density on the filtered light signal 2A has been reduced by 13 dB with respect to the non-filtered light signal (curve S0).

The filtering efficiency difference between the curves S2 and S3 is essentially due to the fact that the flutes of the associated response curve R2 are less contrasted than those of the response curve R3.

Indeed, the excess relative intensity noise at the frequency ISL/2 is essentially due to the interferometric beat between the optical frequencies 2k·ISL of the transmission maxima and the transmission minima offset by a frequency ISL/2 and this interferometric beat depends on the square root of the product of the light powers. It is hence essential that these minima are the closest possible to zero.

The different values (in dB) of reduction of the excess relative intensity noise (RIN) power density at the optimum frequency $f_{optim}$=ISL/2 for the three previous cases (see curves S1, S2 and S3 of FIG. 6), as well as for other values of the ratio T/C of transmission coefficient T to coupling coefficient C of the optical couplers 103, 104 of the filtering interferometer 100 are reported in Table 2.

In Table 2 are also reported:
the finesse F for each of the configurations of the filtering interferometer 100,
the value of the light transmission average, expressed in dB, and
the different values (in dB) of increase of the excess relative intensity noise (RIN) power density at the frequency equal to the free spectral interval ISL, this frequency corresponding to the beats of the flutes of the optical spectrum of the light source 1 that are separated in frequency by this free spectral range ISL (see FIG. 5).

TABLE 2

| | | (dual passage) | | |
|---|---|---|---|---|
| Ratio T (%)/C (%) | Finesse F | Average transmission | Reduction of the RIN power density at the frequency ISL/2 | Increase of the RIN power density at the frequency ISL |
| Mach-Zehnder (S1) | 2 | −3 dB | −3 dB | +2 dB |
| 50/50 (S2) | 4 | −5 dB | −2 dB | +2 dB |
| 60/40 | 6 | −6 dB | −3 dB | +3 dB |
| 70/30 | 9 | −7.5 dB | −4.5 dB | +4.5 dB |
| 80/20 | 14 | −9.5 dB | −6.5 dB | +6.5 dB |
| 90/10 | 30 | −13 dB | −10 dB | +10 dB |
| 95/5 (S3) | 61 | −16 dB | −13 dB | +13 dB |
| 99/1 | 312 | −22 dB | −21 dB | +19 dB |

It is observed in Table 2 that the more high the ratio T/C, i.e. the more fine and contrasted the flutes, the more reduced the excess relative intensity noise $B_{RIN}$ at the optimum frequency $f_{optim}$=ISL/2, in the light signal 2A filtered by the filtering interferometer 100.

Conversely, the excess relative intensity noise $B_{RIN}$ is increased, at the frequency equal to the free spectral range ISL, in the light signal 2A filtered by the filtering interferometer 100.

However, using a filtering interferometer 100 that has a high ratio T/C, it is observed that the average light transmission strongly reduces. Indeed, the average light transmission is approximately proportional to the inverse of the finesse F, the latter increasing with the ratio T/C.

This reduction of the light power of the light signal 2A filtered by the filtering interferometer 100 then causes an increase of the relative photonic noise of this filtered light signal 2A.

To sum-up, it has been seen that it was possible to design a filtering interferometer 100, i.e. herein to adjust the free spectral range ISL and the finesse F thereof so that the modulation frequency $f_m$ of the filtered light signal 2A that will be used by the measurement interferometer 2 to perform the measurement of the parameter to be measured $\Omega_R$ is comprised in the frequency interval INT1, INT2, INT3 centred about the optimum frequency ISL/2 and the width Δf=[0.9−(3/2F)] ISL.

That way, the excess intensity noise on the filtered light signal 2A is reduced with respect to a non-filtered light signal.

This solution is general, and it is not needed that the modulation frequency $f_m$ is close to the value ISL/2.

Indeed, in the most general case, the frequency interval INT1, INT2, INT3 may be centred at any frequency equal to (2k+1) ISL/2, these frequencies corresponding to dark fringes, i.e. troughs of the response curve about which the excess intensity noise is reduced.

Let's note that the operation described does not need polarization-maintaining fiber. Indeed, an ordinary single-mode optical fiber that does not maintain the polarization, has always two polarization-orthogonal eigenmodes. These two eigenmodes have a slightly different index and will hence lead to a slightly different free spectral range ISL, but in terms of reduction of the excess relative intensity noise at low frequencies, the two modes will have the same behaviour.

In order to improve the reduction of the excess relative intensity noise, without too much reduction of the transmitted average light power that increases the relative photonic noise, a dual-passage configuration filtering interferometer may be used.

Hence, with respect to a single-passage configuration as above, the contrast of the flutes is improved and, for a given reduction of excess relative intensity noise, the finesse of the dual-passage filtering interferometer is lower and hence the attenuation of the filtered light signal is limited.

Second Embodiment

Hence, in FIG. 7 is shown an interferometric measurement device 20 including a filtering interferometer 200 in dual-passage configuration.

Figure 9:
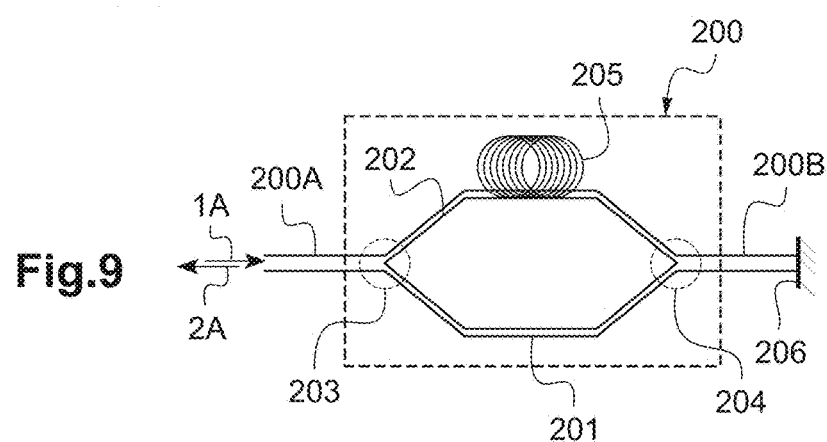
FIG. 9 is a schematic view of a two-wave filtering interferometer of the Mach-Zehnder type, in dual-passage configuration, entering into the construction of the interferometric measurement device according to the second embodiment.

In a first variant, shown in FIG. 9, the filtering interferometer 200 comprises a two-waves interferometer, of the Mach-Zehnder type, similar to the interferometer 100 of FIG. 3.

Moreover, this filtering interferometer 200 herein comprises a mirror 206 placed after the second Y coupler 204 so that the light signal exiting through the second port 200B is reflected towards the Y coupler 204 to circulate again in the Mach-Zehnder interferometer 200.

That way, the light signal entering into the filtering interferometer 200 through the first port 200A, also exits from this first port 200A after recirculation in the two arms of the Mach-Zehnder interferometer.

It will be noted that a two-wave filtering interferometer of the Michelson type would not operate in dual-passage configuration because the return wave would be mixed with the wave reflected at the first passage.

In dual-passage configuration, it is advantageous to control the polarization so that the light signal propagates in the filtering interferometer 200 according to the same natural polarization mode in the forward and return trips.

For that purpose, the filtering interferometer 200 herein comprises a polarization-maintaining optical fiber.

Figure 10:
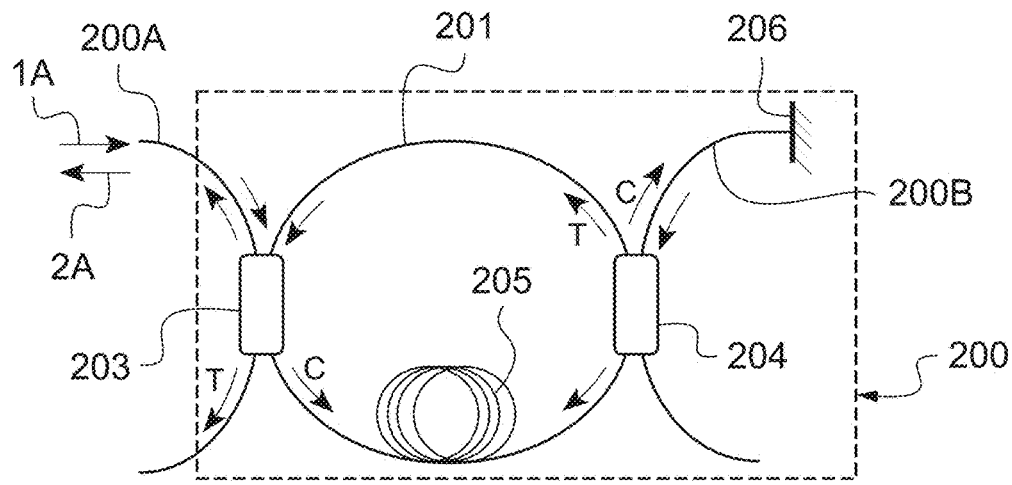
FIG. 10 is a schematic view of a filtering interferometer comprising a fiber-optic ring resonator in the dual-passage configuration, entering into the construction of the interferometric measurement device according to the second embodiment.

In the same way, in a second variant, shown in FIG. 10, the filtering interferometer 200 comprises an multiple-wave ring resonant interferometer similar to the filtering interferometer 100 of FIG. 4.

It will be noted, as hereinabove, that a multiple-wave filtering interferometer of the Fabry-Perot type would not operate in a dual-passage configuration because the return wave would be mixed with the wave reflected at the first passage.

For the same reasons as hereinabove, the filtering interferometer 200 herein comprises a polarisation-maintaining optical fiber.

Moreover, the ring of the multiple-wave filtering interferometer 200 (see FIG. 10) has advantageously a null surface, otherwise, this resonator being also sensitive to the SAGNAC effect, the flutes of the return path are offset with respect to the forward path leading to very high losses.

Such a null-surface configuration may be made in two different ways:
the resonator is made thanks an optical fiber folded over itself from its middle, then rolled, or
the resonator is split into two similar half fiber-optic coils whose axes are in the opposite direction.

This filtering interferometer 200 also comprises a mirror 206 placed after the second fiber coupler 204.

The filtering interferometer 200 being so configured, with the source light signal and the filtered light signal 2A entering and exiting through the same port of the filtering interferometer 200, the interferometric measurement device 20 then includes an optical circulator 7 allowing firstly to direct the source light beam 1A toward the filtering interferometer 200, then to direct the filtered light beam 2A towards the measurement interferometer 2.

To compensate for the losses generated in the filtering interferometer 200, the interferometric measurement device 20 preferentially includes an optical amplifier 8 placed between the filtering interferometer 200 and the measurement interferometer 2.

More precisely, the optical amplifier 8 is herein placed after the optical circulator 7, and before the measurement interferometer 2.

The optical amplifier 8 is herein a doped-fiber optical amplifier, for example an optical amplifier based on a fiber doped with a rare earth such as erbium ("Erbium-doped fiber amplifier" or EDFA).

Figure 8:
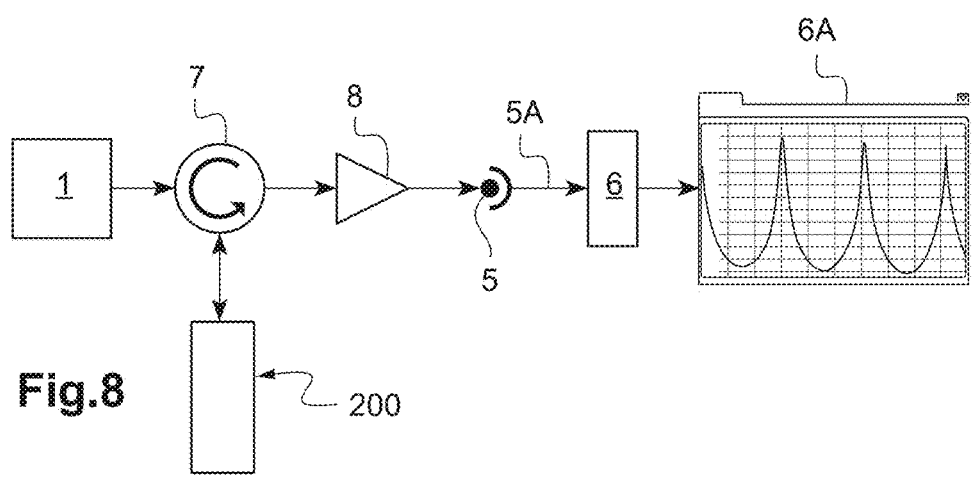
FIG. 8 is a schematic view of an optical mounting allowing to measure the performances of a filtering interferometer entering into the construction of the interferometric measurement device of FIG. 7.

In FIG. 8 is shown an example of optical bench that can be used to evaluate the performances of the filtering interferometer 200 when the latter is in dual-passage configuration.

This bench comprises the light source 1, the optical circulator 7, the filtering interferometer 200 and the optical amplifier 8. Similarly to the first embodiment (see FIG. 2), this optical bench also comprises analysis means with its photo-detector 5 and its electric spectrum analyzer 6, which delivers the electric spectrum 6A allowing to determine the variation of excess intensity noise obtained thanks to the filtering interferometer 200.

Figure 11:
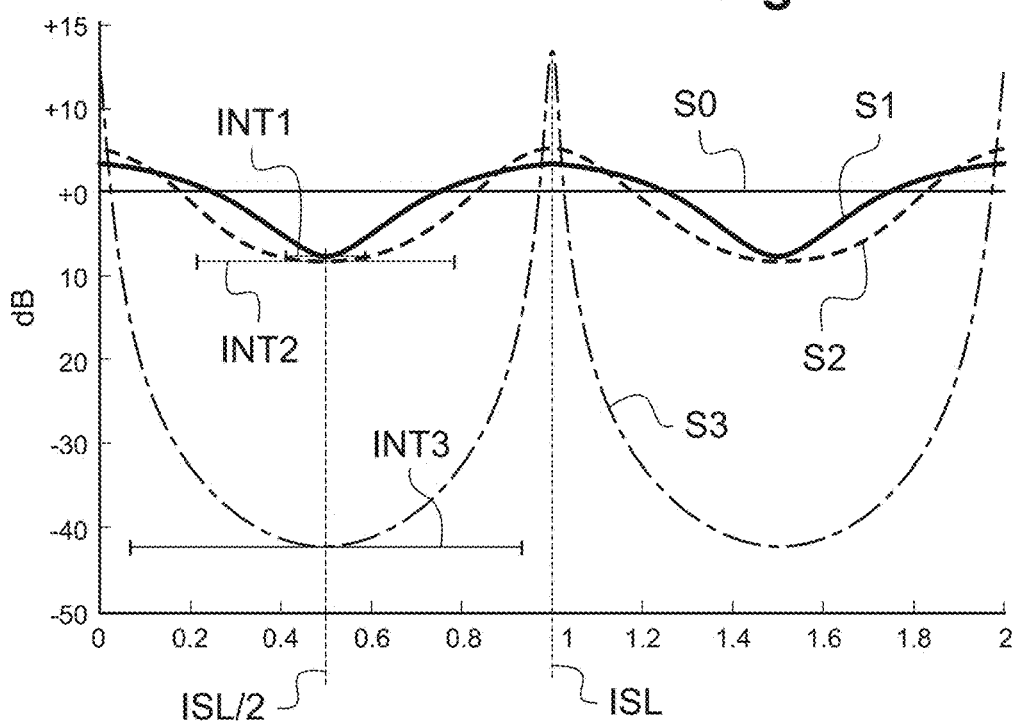
FIG. 11 shows, in logarithmic ordinate, the curves of frequency variations of the excess relative intensity noise power density obtained for the filtering interferometer according to the variants of FIGS. 9 and 10.

Hence, in FIG. 11 are shown the curves S1, S2, S3 obtained with the spectrum analyzer of FIG. 8, by normalizing at 0 dB the original excess intensity noise power density, these curves representing the values of reduction (or increase) of the excess intensity noise as a function of the reduced electric frequency.

The curve S1 is obtained for a filtering interferometer 200 of the same type as that described in FIG. 9, which is a two-wave interferometer.

The curve S2 is obtained for a filtering interferometer 200 of the same type as that of FIG. 10, which is a multiple-wave resonant interferometer, wherein the coupling coefficient C is equal to 50% and the transmission coefficient T is equal to 50%.

The curve S3 is obtained for a filtering interferometer 200 of the same type as that of FIG. 10, which is a multiple-wave resonant interferometer, wherein the coupling coefficient C is equal to 5% and the transmission coefficient T is equal to 95%.

In FIG. 11 are shown, for each curve S1, S2, S3, a frequency interval INT1, INT2, INT3 that is centred about an optimum frequency $f_{optim}$ also equal herein to ISL/2 and of width $\Delta f$ equal to $[0.9-(3/2F)]$ ISL.

It can be observed that, for each curve S1, S2, S3, the frequency interval INT1, INT2, INT3 comprises the modulation frequency $f_m$ of the measurement interferometer 2.

Moreover, for this frequency interval INT1, INT2, INT3, and in particular for the modulation frequency $f_m$, it is observed that the excess intensity noise of the curves S1, S2, S3 has been reduced with respect to the curve S0 corresponding to a non-filtered light signal.

More particularly, for the filtering interferometer 200 of FIG. 9, which is a two-wave interferometer, the value of the excess intensity noise power density on the filtered light signal 2A has been reduced by −8 dB (curve S1) with respect to the non-filtered light signal (curve S0).

Likewise, for the filtering interferometer 200 of FIG. 10, which is a multiple-wave resonant interferometer, in this case a coupling coefficient C equal to 50% (curve S2), the value of the excess intensity noise power density on the filtered light signal 2A has been reduced by −8 dB with respect to the non-filtered light signal (curve S0).

For the filtering interferometer 200 of FIG. 10, which is a multiple-wave resonant interferometer, in this case a coupling coefficient C equal to 5% (curve S3), the value of the excess intensity noise power density on the filtered light signal 2A has been reduced by −42 dB with respect to the non-filtered light signal (curve S0).

The different values of reduction of the excess relative intensity noise (RIN) power density at the optimum frequency $f_{optim}$=ISL/2 for the three previous cases (see curves S1, S2 and S3 of FIG. 11), as well as for other values of the ratio T/C of transmission coefficient T to coupling coefficient C of the optical couplers 203, 204 of the filtering interferometer 200 are reported in Table 3.

In Table 3 are also reported:
the value of the light transmission average, expressed in dB, and
the different values of increase of the excess relative intensity noise (RIN) power density at the frequency equal to the free spectral range ISL.

| Tableau 3 (dual passage) | | | | |
|---|---|---|---|---|
| Ratio T (%)/C (%) | Finesse F | Average transmission | Reduction of the RIN power density at the frequency ISL/2 | Increase of the RIN (dB.V) at the frequency ISL |
| Mach-Zehnder (S1) | 2.8 | −4 dB | −8 dB | +3 dB |
| 50/50 (S2) | 5.7 | −7 dB | −8 dB | +5 dB |
| 60/40 | 8.5 | −9 dB | −12 dB | +6.5 dB |
| 70/30 | 12.7 | −10 dB | −16.5 dB | +8.5 dB |
| 80/20 | 19.8 | −12.5 dB | −22.5 dB | +10.5 dB |
| 90/10 | 42.4 | −15.5 dB | −32.5 dB | +13.5 dB |
| 95/5 (S3) | 86.3 | −18.5 dB | −42 dB | +16.5 dB |
| 99/1 | 441.2 | −24.5 dB | −65.5 dB | +21 dB |

It is hence observed that, when the filtering interferometer 200 is configured in dual-passage mode (case of the interferometric measurement device 20 of FIG. 7), an efficient reduction of the excess intensity noise $B_{RIN}$ on the filtered light signal 2A is obtained with far less attenuation of the transmitted average light power than with the single-passage filtering interferometer 100 of the first embodiment (see for example Table 2).

This is due to the fact that the recirculation of the light signal in the filtering interferometer 200, thanks to the mirror 206, allows to accentuate the troughs between the flutes and to obtain a far better contrast of these latter.

Even reduced in dual-passage, for a given RIN reduction, the optical power attenuation remains significant (see FIG. 3). It is hence advantageous to re-amplify the filtered light signal 2A at the output of the filtering interferometer 200 by means of the optical amplifier 8.

Hence, in this variant of the second embodiment (see FIG. 10), in which the filtering interferometer 200 comprises a ring resonator and two optical couplers 203, 204, the ratios T/C of transmission coefficient T to coupling coefficient C of the optical couplers 203, 204 of the filtering interferometer 200 are, preferably, comprised between 70/30 and 95/5.

Still more preferably, the ratio T/C is comprised between 80/20 and 90/10.

In this second embodiment, it will then be taken care that the total relative noise power density at the input of the optical amplifier 8 is at least lower by 3 to 5 dB than the relative photonic noise desired at the output of the full system.

The invention claimed is:
1. An interferometric measurement device including:
a broad-spectrum spontaneous emission light source,
a measurement interferometer comprising a modulator, and receiving, as an input, a light signal of input light power $P_{in}$ and delivering, as an output, a modulated light signal of output light power $P_{out}$, said modulated light signal being modulated by said modulator at a modulation frequency $f_m$, said modulated light signal depending on a physical parameter to be measured and being proportional to said input light power $P_{in}$, and
an optical radiation detector, receiving the modulated light signal exiting from said measurement interferometer and delivering a modulated electrical signal (3A) proportional to said output light power $P_{out}$,
said interferometric measurement device including a filtering interferometer insensitive to said physical parameter to be measured placed between said light source and said measurement interferometer or between said measurement interferometer and said optical radiation detector,
said filtering interferometer having a filtering interferometer input and a filtering interferometer output,
said filtering interferometer being:
i) a two-wave interferometer configured so that exactly two split light signals, propagated over two respective arms of the filtering interferometer, are being superimposed and interfering with each other to form a filtered light signal transmitted on the output of the filtering interferometer, the filtering interferometer having a free spectral range ISL, expressed in frequency, equal to an inverse of a difference between two respective propagation times of said interfering light signals over said two arms, or
ii) a multiple-wave resonant interferometer comprising a resonator, wherein more than two light signals propagated through said resonator are being superimposed and interfering with each other to form a filtered light signal transmitted on the output of the filtering interferometer, the filtering interferometer having a free spectral range ISL, expressed in frequency, equal to an inverse of a propagation time of said interfering light signals over a resonator passage, said filtering interferometer having a finesse F, and a filtering interferometer response equal to a ratio between a light power outputted by the filtering interferometer and a source light power at the filtering interferometer input, said response presenting, as a function of an optical frequency of a transmitted light, peaks and troughs, said peaks being periodically separated in frequency by the filtering interferometer free spectral range ISL, each of said troughs being located, in frequency, between two said successive peaks, said peaks presenting a full width at half maximum equal to the filtering interferometer free spectral range ISL divided by its finesse F, wherein said filtering interferometer has:

i) in a case the filtering interferometer is a two-wave interferometer, a length-difference between said arms, or ii) in a case the filtering interferometer is a multiple-wave resonant interferometer, a resonator one-passage length, such that the free spectral range ISL of the filtering interferometer defines a frequency interval centred about an optimum frequency $f_{optim}$ equal to (2k+1) ISL/2, k being a natural number, and of width $\Delta f$ equal to [0.9–(3/2F)] ISL, that comprises the modulation frequency $f_m$ of the modulated light signal at the output of the measurement interferometer.

2. The interferometric measurement device according to claim 1, wherein said filtering interferometer is configured in dual-passage mode.

3. The interferometric measurement device according to claim 2, wherein said filtering interferometer comprises a fiber-optic interferometer.

4. The interferometric measurement device according to claim 2, wherein said measurement interferometer comprises a fiber-optic SAGNAC ring interferometer.

5. The interferometric measurement device according to claim 1, wherein said filtering interferometer comprises a fiber-optic interferometer.

6. The interferometric measurement device according to claim 5, wherein said fiber-optic filtering interferometer comprises a polarization-maintaining optical fiber.

7. The interferometric measurement device according to claim 5, wherein said measurement interferometer comprises a fiber-optic SAGNAC ring interferometer, and a length of the optical fiber of the filtering interferometer is slightly higher than a length of the optical fiber of the SAGNAC ring interferometer.

8. The interferometric measurement device according to claim 1, said filtering interferometer being said multiple-wave resonant interferometer, wherein the resonator of the filtering interferometer comprises a ring resonator and two optical couplers whose ratios T/C of transmission coefficient T to coupling coefficient C are comprised between 70/30 and 95/5.

9. The interferometric measurement device according to claim 8, wherein the ring resonator has a null surface.

10. The interferometric measurement device according to claim 1, wherein, when said filtering interferometer is placed between said light source and said measurement interferometer, said interferometric measurement device includes a doped-fiber optical amplifier placed between said filtering interferometer and said measurement interferometer.

11. The interferometric measurement device according to claim 1, wherein said measurement interferometer comprises a fiber-optic SAGNAC ring interferometer.

12. A fiber optic gyrometer including the interferometric measurement device according to claim 11.

13. A fiber optic gyrometer including the interferometric measurement device according to claim 1.

14. The interferometric measurement device according to claim 1, wherein, said filtering interferometer is said two-wave interferometer configured so that the exactly two split light signals, propagated over the two respective arms of the filtering interferometer, are being superimposed and interfering with each other to form the filtered light signal transmitted on the output of the filtering interferometer, the filtering interferometer having the free spectral range ISL, expressed in frequency, equal to the inverse of the difference between two respective propagation times of said interfering light signals over said two arms, and the length-difference between said arms such that the free spectral range ISL of the filtering interferometer defines the frequency interval centred about the optimum frequency $f_{optim}$ equal to (2k+1) ISL/2, and of the width $\Delta f$ equal to [0.9–(3/2F)] ISL, that comprises the modulation frequency $f_m$ of the modulated light signal at the output of the measurement interferometer.

15. The interferometric measurement device according to claim 1, wherein, said filtering interferometer is said multiple-wave resonant interferometer comprising a resonator, wherein the more than two light signals propagated through said resonator are being superimposed and interfering with each other to form the filtered light signal transmitted on the output of the filtering interferometer, the filtering interferometer having the free spectral range ISL, expressed in frequency, equal to the inverse of the propagation time of said interfering light signals over the resonator passage, and the resonator one-passage length such that the free spectral range ISL of the filtering interferometer defines the frequency interval centred about the optimum frequency $f_{optim}$ equal to (2k+1) ISL/2, and of the width $\Delta f$ equal to [0.9–(3/2F)] ISL, that comprises the modulation frequency $f_m$ of the modulated light signal at the output of the measurement interferometer.

16. The interferometric measurement device according to claim 1, wherein, said filtering interferometer comprises a fiber-optic interferometer, said measurement interferometer comprises a fiber-optic SAGNAC ring interferometer, and a length of the optical fiber of the filtering interferometer is between 2% and 5% longer than a length of the optical fiber of the SAGNAC ring interferometer.

* * * * *